United States Patent Office 3,443,898
Patented May 13, 1969

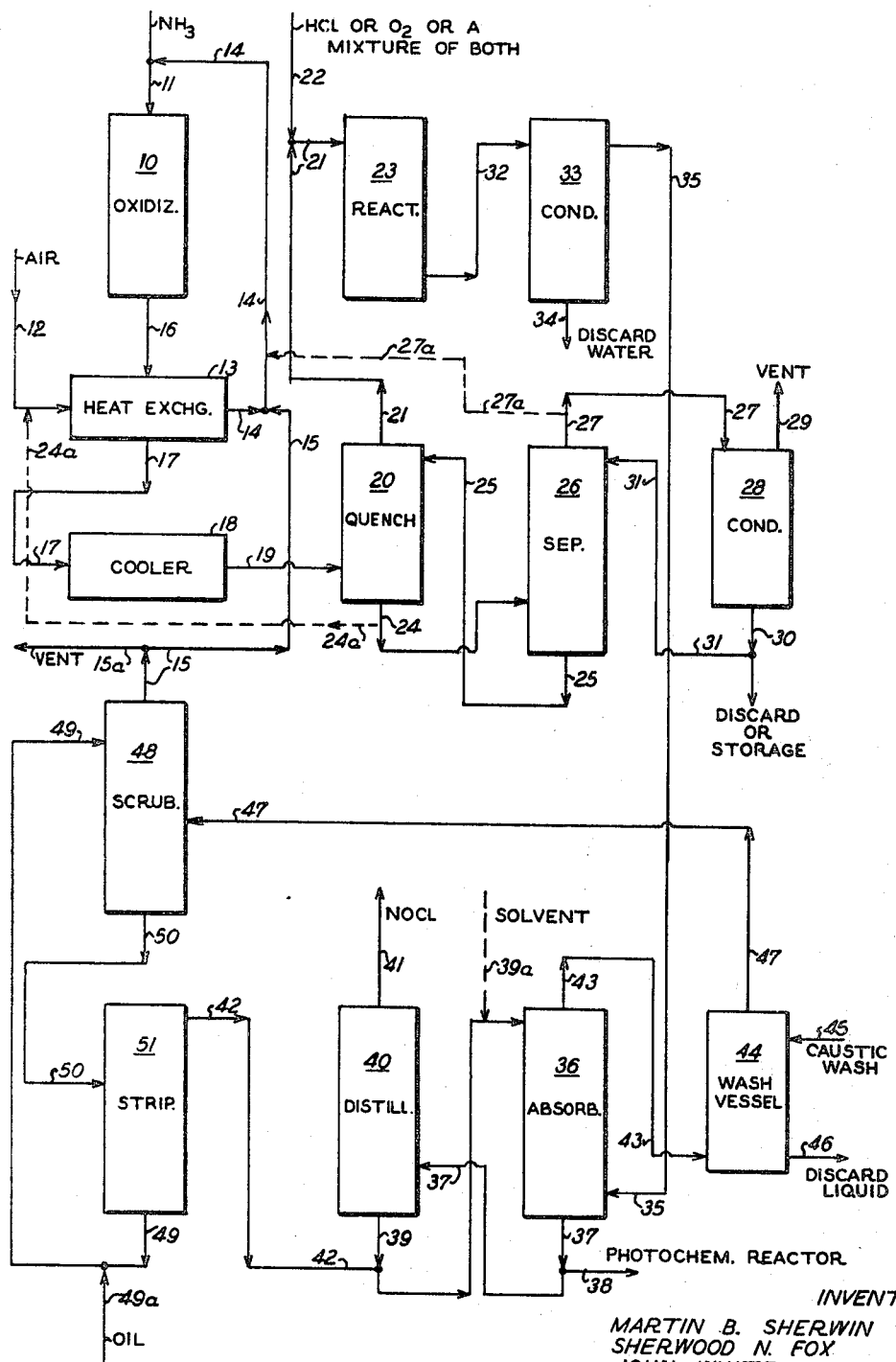

3,443,898
PREPARATION OF NITROSYL CHLORIDE
Martin B. Sherwin, Brooklyn, N.Y., Sherwood N. Fox, Stamford, Conn., and John White Colton, Pelham Manor, N.Y., assignors to Halcon International, Inc., a corporation of Delaware
Continuation-in-part of application Ser. No. 263,949, Mar. 8, 1963. This application July 5, 1966, Ser. No. 562,571
Int. Cl. C01b 21/52, 21/00
U.S. Cl. 23—203                                      10 Claims

ABSTRACT OF THE DISCLOSURE

This invention relates to a process for preparing nitrosyl chloride by oxidizing ammonia with from about 1.25 to about 1.55 moles of oxygen per mole of ammonia in the presence of from about 4.8 to about 25 moles of a diluent per mole of ammonia to form a mixture containing nitrogen compounds and nitrogen free compounds; separating the nitrogen compounds from the nitrogen free compounds; reacting the nitrogen compounds with chlorine, hydrochloric acid or a mixture thereof to form nitrosyl chloride; and recycling at least some of the nitrogen free compounds of the oxidation or at least some of the off gas from the chlorination or both, back to the oxidation step to supply at least part of the diluent for said oxidation step.

---

The present application is a continuation-in-part of our co-pending patent application, Ser. No. 263,949, filed Mar. 8, 1963, and now abandoned.

This invention relates to a process for preparing nitrosyl chloride from ammonia, air and a chlorinating agent, by oxidation of the ammonia followed by reaction of the oxidation product with a chlorinating agent.

Nitrosyl chloride is a commercially interesting material. For some purposes, however, its cost is rather prohibitive, and the art is confronted by the problem of producing it in a more advantageous and economical manner.

It is therefore an object of the present invention to provide a new and improved process for the production of nitrosyl chloride. Another object is to provide a more efficient process wherein ammonia is oxidized to form nitrosyl chloride. Another object is to provide a more efficient process wherein the ammonia is oxidized, under controlled conditions and wherein essentially all of the nitrogen-containing oxidation product is converted to nitrosyl chloride in the chlorination step. These and other objects of the present invention will become apparent from the following description.

According to the present invention ammonia is oxidized with from about 1.25 mols to about 1.55 mols of oxygen per mol of ammonia in the presence of from about 4.8 mols to about 25 mols of inert diluent gas per mol of ammonia. The nitrogen-free oxidation products, chiefly water, are removed, and the nitrogen-containing oxidation product is then chlorinated to form nitrosyl chloride. Essentially all of the nitrogen-containing oxidation product is converted to nitrosyl chloride. The nitrosyl chloride is separated from the diluent gas and at least part of the separated diluent gas is recycled to the oxidation step.

The oxidation is carried out under such conditions that the nitrogen-containing oxidation product is essentially entirely nitric oxide (the minimum degree of oxidation permitted according to the present invention), or is an essentially equimolar mixture of nitric oxide and nitrogen dioxide (the maximum degree of oxidation permitted according to the present invention). It is also possible to have mixtures between the minimum and maximum degree of oxidation wherein the molar quantity of nitrogen dioxide is less than that of the nitric oxide.

When ammonia is oxidized with about 1.25 mols of oxygen per mol of ammonia, and in the presence of from about 12 to about 25 mols of inert diluent gas per mol of ammonia, the nitrogen-containing oxidation product is essentially nitric oxide.

When ammonia is oxidized with about 1.55 mols of oxygen per mol of ammonia, and in the presence of about 4.8 mols of inert diluent gas per mol of ammonia, the nitrogen-containing oxidation product is an essentially equimolar mixture of nitric oxide and nitrogen dioxide.

When ammonia is oxidized with amounts of oxygen greater than about 1.25 mols per mol of ammonia and less than about 1.55 mols per mol of ammonia, and in the presence of amounts of inert diluent gas greater than about 4.8 mols per mol of ammonia and less than about 12 mols per mol of ammonia, the nitrogen-containing oxidation product is a mixture of nitric oxide and nitrogen dioxide, the nitrogen dioxide being present in molar quantities less than that of the nitric oxide.

From the foregoing discussion it will be seen that the lower quantity of oxygen and the upper quantity of inert diluent gas are used per mol of ammonia to obtain a product consisting essentially of nitric oxide while, on the other hand, the upper quantity of oxygen and the lower quantity of inert diluent gas are used per mol of ammonia to obtain a product consisting essentially of equimolar quantities of nitric oxide and nitrogen dioxide. Intermediate quantities of oxygen and of inert diluent gas provide less than equimolar mixtures of the two nitrogen oxides, the nitrogen dioxide being present in lesser amount. The inert diluent gas functions as a heat sink to control the temperature which in turn determines the oxidation products.

Even where the ammonia oxidation product is controlled to produce only nitric oxide, and where the chlorinating agent used is chlorine, a small amount of water may be present in the system, and it is desirable in such cases to add a small amount of material to prevent freezing of the water when operating at conditions at or below the freezing point thereof. An example of such a material is hydrogen chloride.

The oxygen source is preferably air. It is a feature of the present invention that at least part of the inert diluent gas is recycled to the ammonia oxidation step from a processing step downstream of said oxidation step. The inert diluent gas is preferably nitrogen obtained by recycling the off gases obtained from the nitrosyl chloride absorption; other inert diluent gas which may be produced in the process, e.g., water vapor, may also be used. The amount of water used as diluent may be from about 0.1 mol to about 3.5 mols per mol of ammonia.

Depending upon the products obtained in the ammonia oxidation step the chlorinating agent may be either hydrogen chloride vapor or nitrosyl chloride vapor. In the former case, excess hydrogen chloride is employed so as to form with the by-product water an aqueous solution containing from about 15% to about 21% of HCl.

When the chlorinating agent consists solely of gaseous hydrogen chloride and ammonia oxidation is carried out in the presence of about 1.55 mols of oxygen per mol of ammonia and about 4.8 mols of diluent gas so as to yield an essentially equimolar ratio of nitrogen dioxide and nitric oxide. All of the nitrogen oxides in such an oxidation mixture react with hydrogen chloride to form nitrosyl chloride as follows:

$$NO_2 + NO + 2HCl \rightarrow 2NOCl + H_2O$$

When the chlorinating agent consists solely of chlorine gas the ammonia oxidation is carried out in the presence of from about 1.25 mols of oxygen per mole of ammonia and from about 12 up to about 25 mols of diluent gas so as to yield an oxidation product containing essentially nitric oxide. Nitric oxide reacts with chlorine to form nitrosyl chloride as follows:

$$2NO + Cl_2 \rightarrow 2NOCl$$

When the ammonia oxidation is carried out in the presence of amounts of oxygen greater than about 1.25 mols and below about 1.55 mols per mol of ammonia and inert diluent gas greater than about 4.8 mols and below about 12 mols of diluent per mol of ammonia, the chlorination is carried out by means of mixtures of hydrogen chloride and chlorine, the amount of chlorine being proportional to the molar excess of nitric oxide over nitrogen dioxide.

According to one embodiment of the present invention ammonia is oxidized at a temperature of from about 1100° F. to about 3190° F. and at pressures of from about atmospheric to about 1000 p.s.i.g., preferably from about slightly above atmospheric to about 300 p.s.i.g., and most preferably from about 25 p.s.i.g. to about 250 p.s.i.g., in the presence of from about 1.25 to about 1.55 mols of oxygen per mol of ammonia and in the presence of from about 4.8 to about 25 mols of diluent per mol of ammonia. After the oxidation reaction mixture containing the desired oxides is heat exchanged to recover heat values, it may be filtered in known manner and is then treated to remove nitrogen-free products, chiefly water. This may be accomplished by quenching the reactor effluent in concentrated aqueous nitric acid, preferably, an azeotropic mixture of nitric acid and water. The use of concentrated nitric acid minimizes the reaction of nitrogen dioxide with water and also absorbs substantially all of the water in the gaseous mixture. The quench liquid absorbs water and gradually becomes more dilute. To maintain the desired concentration of nitric acid, a portion of the quench liquid is withdrawn and treated to remove water thereby concentrating nitric acid which is returned to the quench liquid. The separated water may be discarded, or a portion thereof may be passed to the ammonia oxidation step for use as inert diluent. It is also possible to employ some quench liquid as inert diluent, in the same quantity on a molar basis as water.

The substantially dry nitrogen-containing gases are then reacted with a chlorinating agent, either hydrogen chloride, chlorine or mixtures thereof, in a quantity sufficient to convert essentially all of the nitrogen-containing gas to nitrosyl chloride. The reaction takes place at temperatures of from about 20° F. to about 60° F., preferably from about 20° F. to about 30° F. and at pressures from about atmospheric or below to about 1000 p.s.i.g. Preferably, enough excess hydrogen chloride is introduced into the reaction mixture so that the byproduct water vapor forms aqueous hydrochloric acid containing about 19% or more by weight of hydrogen chloride (an azeotropic mixture).

For a quenched and substantially dry gas mixture containing about 16 mols of nitric oxide and about 15 mols of nitrogen dioxide per hour, a feed of about 32 mols per hour of hydrogen chloride and about 243 mols per hour of nitrogen is used, along with small amounts of other materials. Liquid water is kept at a minimum to avoid decomposition of the chloride. The crude nitrosyl is then treated to remove water and absorbed in a solvent at temperatures below about 100° F. Any suitable absorption solvent may be used. Examples of such solvents are cyclohexane, carbon tetrachloride, perchloroethylene and the like. The nitrosyl chloride is then recovered from the solvent by desorption and subjected to further purification. The off-gas (chiefly nitrogen) from the nitrosyl chloride absorption step is recovered and recycled to the ammonia oxidation step for use as diluent. Any solvent carried out with the scrubbed gas is recovered by scrubbing with a heavy oil such as a petroleum naphtha boiling at about 300° F. and desorption from the oil.

In order to indicate still more fully the nature of the present invention the following examples of typical procedures are set forth in which parts and percents means parts and percents by weight, respectively, unless otherwise indicated, it being understood that these examples are presented as illustrative only and they are not intended to limit the scope of the invention.

EXAMPLE 1

The equipment used is that which is usual for the production of nitric acid. Referring to the drawing, the oxidizer 10 is charged with ammonia vapor at a temperature of 24° F. introduced via line 11 and with air introduced via lines 14 and 11. The air previously has passed through heat exchanger 13 where it has been compressed and brought to a temperature of 350° F. Recycle gas at a temperature of 127° F. from scrubber 48 is introduced to oxidizer 10 via lines 15, 14, and 11. The recycle gas is substantially all nitrogen but does contain small amoutns of nitric oxide, nitrogen dioxide, and may also contain some water and some hydrocarbon. The oxidation reaction is conducted at about 1700° F. and at a pressure of about 50 p.s.i.a. The oxidation reaction mixture is passed via line 16 through heat exchanger 13 and via line 17 to cooler 18.

The oxidation reaction mixture is then passed via line 19 to vessel 20 wherein it is quenched with concentrated azeotropic aqueous nitric acid introduced via line 25. Makeup nitric acid is added to vessel 20 as required. The quench effluent liquid is concentrated in separator 26 and the water is passed overhead via line 27 to condenser 28. Noncondensible gases are vented via line 29 and water is discarded via line 30. The quench liquid is introduced into vessel 20 from line 25 at a temperature of about 60° F. and a rate of about 208 mols of nitric acid an about 388 mols of water per hour. The quenched and substantially dry gas is passed overhead via line 21 to reactor 23. Hydrogen chloride is introduced to reactor 23 via line 22 and reacts with the quenched gas to form crude nitrosyl chloride.

The crude reaction mixture is passed via line 32 to condenser 33 wherein water or aqueous hydrochloric acid is condensed and separated out; it may be removed via line 34 and passed to storage, or discarded. The remaining gas is passed via line 35 to absorber 36 wherein the nitrosyl chloride is scrubbed with cyclohexane introduced via line 39 at a temperature of aboue 60° F. and at a rate of from about 1000 to about 3000 mols per hour. This produces a solution suitable for feeding to a photochemical reactor. Additional or makeup absorption solvent may be introduced via line 39a. The scrubber liquid leaves via line 37 at a temperature of about 80° F. The scrubber gas in line 43 (from absorber 36) contains about 143 mols per hour of nitrogen and about 10 to 20 mols per hour of cyclohexane. The scrubbed gas is passed to a caustic wash vessel 44 wherein it is treated with caustic introduced via line 45. The resulting wash liquid is discarded via line 46. The solution of nitrosyl chloride in solvent withdrawn as bottoms from absorber 36 may be passed via lines 37 and 38 to a photochemical reactor wherein it is converted to cyclohexanone oxime hydrochloride in known manner, or it may be passed via line 37 to distillation column 40 where nitrosyl chloride is recovered as overhead from line 41. Hydrogen chloride which is released in the Beckmann rearrangement downstream of the photochemical reaction may be recycled to the nitrosyl chloride formation step (connection not shown) or first sparged through the photochemical reactor to improve selectivity there and then recycled to the nitrosyl chloride reactor. In either case there is no substantial net consumption of hydrogen chloride in the overall process. The solvent is removed as bottoms and returned via line 39 to absorber 36.

The scrubbed gas in vessel 44 is passed via line 47 to scrubber or column 48 wherein it is contacted with a heavy oil. The resulting scrubbed gas is passed via lines 15, 14 and 11 back to the oxidizer 10. A part thereof may be vented via line 15a. The oil solution is passed as bottoms from column 48 via line 50 to column 51, wherein the solvent is stripped from the oil and then passed via lines 42 and 39 back to the absorber 36. The stripper oil is passed via line 49 back to column 48. Make-up oil may be introduced via line 49a.

In an alternative, some or all of the diluent for the oxidation reaction mixture may be provided by passing a portion of the liquid mixture resulting from the quenching step via line 24 and 24a to the air feed line wherein it may be aspirated and then heated and passed with the air to the reactor 10.

In another alternative, some or all of the recycled diluent for the oxidation reaction mixture may be provided by passing vaporized aqueous overhead mixture from separator 26 which may contain some oxide of nitrogen or nitric acid or both via lines 27 and 27a into line 14 and from there to the oxidizer 10, as already described.

EXAMPLE 2

The procedure of Example 1 is repeated except that the recycle diluent for the oxidation reaction mixture is provided by recycling a liquid mixture resulting from the quenching step (3.52 mols of 60% by weight aqueous nitric acid) to the air inlet line where it is aspirated and then heated and passed into reactor 10. This is equal to 0.11 mol of diluent (liquid) per mol of ammonia. One advantage of using this type of stream as the diluent is that a part of the diluent is condensed in the quenching step and this results in a lower volume requirement for the apparatus downstream therefrom. One particular advantage of liquid recycle is that heat is absorbed in decomposing the mixture in the oxidation zone.

A further advantage of liquid recycle is that one may employ direct contact heat exchange with the attendant advantages as to both process and economy.

EXAMPLE 3

The process of Example 1 is repeated except that at least a part of the recycled diluent is provided by passing aqueous vapor via lines 27 and 27a into line 14 and then via line 11 to oxidizer 10. This procedure also gives advantages analogous to those of Example 2.

If desired, mixtures or permutations or combinations of the above mentioned recycle streams may be used. The procedure may be adjusted to produce from 0 to 1.5 mols of nitrogen dioxide per mol of nitric oxide by selecting corresponding proportions of oxygen and diluent to ammonia in the feed. Generally, known oxidation reaction conditions may be maintained including temperatures and pressures as are conventional for the production of nitric acid. Although the nitric acid quench is preferred for cooling and drying the oxidation reaction mixture, other known means may be used therefore. The use of excess hydrogen chloride is preferred in the nitrosyl chloride reaction mixture as already indicated. However, substantially stoichiometric amounts are operative, although they may require other means for drying and may result in decreased yields due to reaction of nitrosyl chloride with byproduct water. Any equivalent means may be used for recovering the nitrosyl chloride from the crude gaseous reaction mixture, although scrubbing with cyclohexane is preferred especially if the end product is to be caprolactam. Any convenient means may be used for processing the nitrosyl chloride spent gas to recover gases therefrom and produce a recycle gas mixture.

In view of the foregoing disclosures, variations and modifications thereof will be apparent to one skilled in the art, and it is intended to include within the invention all such variations and modifications except as do not come within the scope of the appended claims.

What is claimed is:

1. A process for preparing nitrosyl chloride which comprises in combination the steps of (a) oxidizing ammonia with from about 1.25 to about 1.55 moles of oxygen per mole of ammonia in the presence of from about 4.8 to about 25 moles of diluent per mole of ammonia, to form a mixture containing nitrogen oxidation products consisting of at least one of nitrogen oxide and nitrgen dioxide and nitrogen free oxidation products consisting essentially of water; (b) separating said nitrogen oxidation product from said nitrogen free oxidation product; (c) chlorinating said nitrogen oxide product with (1) chlorine when said product is nitric oxide, (2) hydrogen chloride when said product is an equimolar mixture of nitrogen dioxide and nitric oxide, and (3) a mixture of hydrogen chloride and chlorine when said product is a mixture of nitrogen dioxide and molar excesses of nitric oxide; (d) separating nitrosyl chloride and nitrogen off gas from the reaction mixture; and (e) recycling at least some of and at least one of, the materials selected from the group consisting of said nitrogen free oxidation product of step (b) and said off gas of step (d) back to the oxidation step (a) to provide at least some diluent for said oxidation step.

2. A process according to claim 1 wherein the ammonia is oxidized with about 1.25 mols of oxygen per mol of ammonia in the presence of from about 12 to about 25 mols of diluent per mol of ammonia, thereby producing essentially nitric oxide, and converting said nitric oxide to nitrosyl chloride by reaction with chlorine.

3. A process according to claim 1 wherein the ammonia is oxidized with about 1.55 mols of oxygen per mol of ammonia in the presence of about 4.8 mols of diluent per mol of ammonia, thereby producing an essentially equimolar mixture of nitric oxide and nitrogen dioxide, and converting said essentially equimolar mixture to nitrosyl chloride by reaction with hydrogen chloride.

4. A process according to claim 1 wherein the ammonia is oxidized with more than about 1.25 mols of oxygen per mol of ammonia and less than about 1.55 mols of oxygen per mol of ammonia in the presence of more than about 4.8 and less than about 12 mols of diluent per mol of ammonia, thereby producing a mixture of nitric oxide and nitrogen dioxide, the molar quantity of nitric oxide being in excess of that of the nitrogen dioxide, and converting essentially all of said mixture to nitrosyl chloride by reaction with a mixture containing hydrogen chloride and chlorine.

5. A process according to claim 4 wherein the amount of chlorine is proportional to the molar excess of nitric oxide over nitrogen dioxide.

6. A process according to claim 1 wherein water is separated from the ammonia oxidation product by quenching said product in concentrated aqueous nitric acid.

7. A process according to claim 1 wherein the nitrosyl chloride is separated from the diluent by being absorbed in a solvent.

8. A process according to claim 7 wherein at least part of the diluent is recycled to the ammonia oxidation step.

9. A process according to claim 7 wherein nitrosyl chloride is recovered as product by desorption from the solvent at temperatures below about 100° F.

10. A process according to claim 6 wherein the nitrosyl chloride is separated from the diluent by being absorbed in a solvent and recovered as product by desorption from the solvent at temperatures below about 100° F.

References Cited

UNITED STATES PATENTS 2,185,579  1/1940  Beekhuis.
2,210,439  8/1940  Agel.
2,228,273  1/1941  Klingelhoefer.

(Other references on following page)

UNITED STATES PATENTS

| | | |
|---|---|---|
| 2,240,668 | 5/1941 | Reed. |
| 2,366,518 | 1/1945 | Grebe et al. |
| 2,855,279 | 10/1958 | Walter. |
| 3,290,115 | 12/1966 | Smai et al. |
| 3,336,110 | 8/1967 | Ito et al. |

OSCAR R. VERTIZ, *Primary Examiner.*

E. C. THOMAS, *Assistant Examiner.*

U.S. Cl. X.R.

23—162